(12) United States Patent
Shami et al.

(10) Patent No.: US 10,496,997 B2
(45) Date of Patent: **\*Dec. 3, 2019**

(54) NEURAL NETWORK SYSTEMS AND METHODS FOR GENERATING DISTRIBUTED REPRESENTATIONS OF ELECTRONIC TRANSACTION INFORMATION

(71) Applicant: Capital One Services, LLC, McLean, VA (US)

(72) Inventors: Mohammad Shami, Foster City, CA (US); Bogdan Nedanov, Bethesda, MD (US); Conor Anstett, Bloomfield Hills, MI (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/010,305

(22) Filed: Jun. 15, 2018

(65) Prior Publication Data
US 2019/0012671 A1 Jan. 10, 2019

Related U.S. Application Data

(63) Continuation of application No. 15/632,158, filed on Jun. 23, 2017.

(Continued)

(51) Int. Cl.
*H04L 29/06* (2006.01)
*G06Q 20/40* (2012.01)
(Continued)

(52) U.S. Cl.
CPC ....... *G06Q 20/4016* (2013.01); *G06F 16/332* (2019.01); *G06N 3/0427* (2013.01);
(Continued)

(58) Field of Classification Search
CPC ........... G06Q 20/4016; G06Q 20/4014; G06Q 20/405; G06F 16/332; G06F 17/30637;
(Continued)

(56) References Cited

U.S. PATENT DOCUMENTS

| 4,718,093 A * | 1/1988 | Brown | .................. G10L 15/00 704/243 |
| 9,231,979 B2 * | 1/2016 | Duke | ..................... H04L 63/20 |

(Continued)

OTHER PUBLICATIONS

Bengio, Yoshua et al., "A Neural Probabilistic Language Model", *Journal of Machine Learning Research*, 3 (2003) pp. 1137-1155.

*Primary Examiner* — Joseph P Hirl
*Assistant Examiner* — Stephen T Gundry
(74) *Attorney, Agent, or Firm* — Finnegan, Henderson, Farabow, Garrett & Dunner, LLP

(57) ABSTRACT

Computer-implemented methods and systems are provided for generating a distributed representation of electronic transaction data. Generation may include receiving electronic transaction data including first and second entity identifiers. Generation may also include generating an output distributed representation by iteratively updating a distributed representation using the electronic transaction data. The distributed representation may include rows corresponding to first entity identifiers and rows corresponding to second entity identifiers. An iterative update may include generating a training sample and an embedding vector using the components and the distributed representation; determining, by a neural network, a predicted category from the embedding vector; and updating the distributed representation using the predicted category and the training sample. The embodiments may also include outputting the output distributed representation to determine authorization of electronic transactions. Disclosed embodiments may receive an (Continued)

electronic transaction and determine whether to authorize it based on a distributed representation of electronic transaction data.

18 Claims, 10 Drawing Sheets

Related U.S. Application Data

(60) Provisional application No. 62/353,859, filed on Jun. 23, 2016.

(51) Int. Cl.
*G06F 16/332* (2019.01)
*G06N 3/04* (2006.01)
*G06N 3/08* (2006.01)

(52) U.S. Cl.
CPC ............ *G06N 3/08* (2013.01); *G06Q 20/405* (2013.01); *G06Q 20/4014* (2013.01); *H04L 63/1408* (2013.01); *H04L 2463/102* (2013.01)

(58) Field of Classification Search
CPC .... G06N 3/0427; G06N 3/08; H04L 63/1408; H04L 2463/102
See application file for complete search history.

(56) References Cited

U.S. PATENT DOCUMENTS

| | | | | |
|---|---|---|---|---|
| 10,037,526 B2* | 7/2018 | Campos | ............ | G06Q 20/3674 |
| 10,103,953 B1* | 10/2018 | Chang | ............... | G06Q 10/0639 |
| 2004/0070759 A1* | 4/2004 | Anderson | ................. | G01J 4/04 |
| | | | | 356/364 |
| 2004/0072577 A1* | 4/2004 | Myllymaki | ............... | G01S 5/02 |
| | | | | 455/456.1 |
| 2006/0112041 A1* | 5/2006 | Hitt | ..................... | G06K 9/6217 |
| | | | | 706/20 |
| 2007/0022068 A1* | 1/2007 | Linsker | ................ | G05B 13/026 |
| | | | | 706/23 |
| 2011/0231305 A1* | 9/2011 | Winters | ................ | G06Q 20/10 |
| | | | | 705/39 |
| 2013/0204815 A1* | 8/2013 | Grothmann | ............... | G06N 3/08 |
| | | | | 706/16 |
| 2014/0282856 A1* | 9/2014 | Duke | ...................... | H04L 63/20 |
| | | | | 726/1 |
| 2015/0186424 A1* | 7/2015 | Woo | ......................... | H04N 7/18 |
| | | | | 348/77 |
| 2015/0269579 A1* | 9/2015 | Subramanian | ..... | G06Q 20/4016 |
| | | | | 705/44 |
| 2016/0071017 A1* | 3/2016 | Adjaoute | ................ | G06N 20/00 |
| | | | | 706/52 |
| 2016/0292690 A1* | 10/2016 | Faith | .................. | G06Q 20/4016 |
| 2017/0004506 A1* | 1/2017 | Steinman | ............ | G06Q 20/4014 |
| 2017/0046806 A1* | 2/2017 | Haldenby | .......... | G06Q 20/0655 |
| 2017/0148021 A1* | 5/2017 | Goldstein | ............. | H04L 67/104 |
| 2017/0161772 A1* | 6/2017 | Xu | ...................... | G06F 16/2455 |
| 2017/0178247 A1* | 6/2017 | Farrell | ................... | G06Q 40/12 |
| 2017/0193469 A1* | 7/2017 | Hernandez | ........... | G06Q 20/102 |
| 2017/0221067 A1* | 8/2017 | Barquero Garro | ......................... | |
| | | | | G06Q 20/40145 |
| 2017/0249608 A1* | 8/2017 | Rooke | ..................... | G06Q 40/02 |
| 2017/0364705 A1* | 12/2017 | Villars | ................ | G06F 21/6227 |
| 2017/0364935 A1* | 12/2017 | Palsar | ................ | G06Q 30/0226 |
| 2018/0012163 A1* | 1/2018 | Smith | .................... | G06F 16/243 |
| 2018/0060437 A1* | 3/2018 | Gao | ........................ | G06N 3/08 |
| 2018/0068395 A1* | 3/2018 | Gupta | ...................... | G06N 3/08 |
| 2018/0101832 A1* | 4/2018 | Chauhan | ................ | G06Q 20/202 |
| 2018/0101851 A1* | 4/2018 | Lowenberg | ........ | G06Q 20/4016 |
| 2018/0137514 A1* | 5/2018 | Wiesman | ........... | G06Q 20/4016 |
| 2018/0144345 A1* | 5/2018 | Wagner | ............. | G06Q 20/4014 |
| 2018/0150843 A1* | 5/2018 | Adjaoute | ................ | G06N 20/00 |
| 2018/0197171 A1* | 7/2018 | Steinman | ............ | G06Q 20/227 |
| 2018/0204217 A1* | 7/2018 | Bedi | ................ | G06Q 20/4016 |
| 2018/0276666 A1* | 9/2018 | Haldenby | ............... | H04L 63/10 |
| 2018/0293573 A1* | 10/2018 | Ortiz | .................... | G06Q 20/023 |
| 2018/0315047 A1* | 11/2018 | Kennedy | ............ | G06Q 20/407 |
| 2018/0349922 A1* | 12/2018 | Carlson | ............. | G06Q 30/0254 |

* cited by examiner

NEURAL NETWORK SYSTEMS AND METHODS FOR GENERATING DISTRIBUTED REPRESENTATIONS OF ELECTRONIC TRANSACTION INFORMATION

CROSS-REFERENCE TO RELATED APPLICATIONS

This application is a continuation of U.S. application Ser. No. 15/632,158, filed Jun. 23, 2017, now pending, which claims the benefit of U.S. Provisional Application 62/353,859, filed Jun. 23, 2016. Each of the above applications is incorporated herein by reference in its entirety.

TECHNICAL FIELD

The disclosed embodiments concern the generation of distributed representations of electronic transaction information using machine learning systems. More specifically, the disclosed embodiments concern neural network systems that use machine learning for generating distributed representations of electronic transaction information, and authorizing electronic transactions electronic transaction authorization using such distributed representations.

BACKGROUND

Electronic data transfers often fall victim to fraud due to identity theft, data breaches, or otherwise insecure systems. Current methods of fraud detection depend on simple models and rules to identify potentially fraudulent electronic transactions. For example, such conventional methods may rely on whether a physical token associated with electronic data is physically present at a certain geographic transaction, a history of fraudulent electronic transactions associated with certain electronic data, or a classification associated with insecure electronic data transfers. But these simple models are imperfect, often missing actual fraud while flagging innocuous electronic transactions as fraudulent. Fraudulent electronic transactions often result in insecure data management and transfer systems as well as decreased computer system performance due to excess processing load due to the fraudulent electronic transactions, and additional corrective actions taken to remedy the fraud.

Accordingly, improved systems are needed for identifying fraudulent electronic data transactions and controlling the authorization of such electronic transactions, to reduce computer system loads, improve system efficiency, and enhance electronic data security.

SUMMARY

The disclosed embodiments may enable generation of a distributed representation of electronic transaction data. For example, a generation system may be configured to learn a distributed representation of electronic transaction component values from received electronic transaction data. Authorization systems may be configured to use this distributed representation of electronic transaction component values to approve or deny further electronic transactions.

The disclosed embodiments provide a specific way to generate distributed representations of electronic transactions using existing, unlabeled electronic transaction data. These distributed representations may be used to authorize electronic transactions, reducing the cost of fraudulent electronic transactions. These systems and methods may benefit from improved performance over simple, conventional models, and may allow the beneficial use of immense amounts of currently unused, unlabeled electronic transaction information. Therefore the generation and use of these distributed representations represents an innovative, technical improvement to electronic transaction authorization infrastructure that is not routine or conventional in the field of electronic transaction authorization.

The disclosed embodiments may further include, for example, a computer-implemented method for generating a distributed representation of electronic transaction data. This computer-implemented method may comprise steps. The steps may include receiving electronic transaction data. The electronic transaction data may include components of an electronic transaction. The components may include a first entity identifier and a second entity identifier. The steps may further include generating an output distributed representation by iteratively updating a distributed representation. The updating may use the electronic transaction data. The distributed representation may include rows corresponding to first entity identifiers and rows corresponding to second entity identifiers. An iteration of the updating may comprise operations. These operations may include generating a training sample and an embedding vector using the components and the distributed representation. These operations may further include determining, by a neural network, a predicted category from the embedding vector. The operations may additionally include updating the distributed representation using the predicted category and the training sample. The steps of the computer-implemented method may further include outputting the output distributed representation to determine authorization of electronic transactions.

In some aspects, one of the components may be selected as the training sample. A length of the embedding vector may equal a length of the rows of the distributed representation. Generating the embedding vector may comprise averaging rows of the distributed representation corresponding to the components.

In some aspects, updating the distributed representation may comprise calculating an update vector representing the effect on a cost function of changing the embedding vector, and updating the rows of the distributed representation corresponding to the components using the update vector. A length of the update vector may equal a length of the rows of the distributed representation. The update vector may contribute equally to the rows of the distributed representation corresponding to the components.

In some aspects, the components may further include a continuous variable, and generating the training sample and the at least one embedding vector may comprise discretizing the continuous variable. The continuous variable may be an electronic transaction time or an electronic transaction amount. The components further include at least one of electronic transaction day-of-week, day-of-month, and day-of-year.

In some aspects, the computer-implemented method may further comprise determining first entity identifier frequencies in the electronic transaction data. Generating the final distributed representation may further include resampling the electronic transaction data based on the first entity identifier frequencies. The distributed representation may include between 80 and 120 features, and the neural network may comprise a hidden layer including between 80 and 120 nodes.

In some aspects, the generating the output distributed representation may further comprise aligning multiple distributed representations. Aligning multiple distributed representations may comprise steps. The steps may include identifying common rows in the distributed representation and another distributed representation. The steps may further include aligning the distributed representation and the other distributed representation using values of the common rows. The steps may also include combining the distributed representation and the other distributed representation to form the output distributed representation. Aligning the distributed representation and the other distributed representation may comprise determining a transformation that minimizes a function of the values of the common rows. The distributed representation and other distributed representation may be combined using this transformation. The other distributed representation may be generated using other electronic transaction data. The electronic transaction data and the other electronic transaction data may correspond to at least one of different time periods, geographic areas, and second entity demographic groups. The common rows may correspond to first entity identifiers.

The disclosed embodiments may further include, for example, an authorization server. The authorization server may include at least one processor and at least one non-transitory computer readable medium. The non-transitory computer readable medium may contain instructions that, when executed by the at least one processor, cause the authorization server to perform operations. These operations may comprise receiving components of an electronic transaction from a first system, the components including a first entity identifier and a second entity identifier. The operations may further comprise generating a representation of the electronic transaction using the components and a distributed representation of electronic transaction data. The electronic transaction data may include rows corresponding to the components. The operations may include determining authorization of the electronic transaction by applying a decision rule. The decision rule may use the representation of the electronic transaction, and representations of past electronic transactions associated with at least one of the first entity identifier and the second entity identifier. The operations may include providing an authorization indication to the first system based on the determined authorization.

In some aspects, the first entity identifier may correspond to a first entity associated with the first system. Applying the decision rule may comprise determining whether a distance between the representation of the electronic transaction and a point dependent on the representations of past electronic transactions exceeds a value. Generating the representation of the electronic transaction may comprise multiple steps. The steps may include determining a first row of the distributed representation of electronic transaction data corresponding to the first entity identifier. The steps may also include determining a second row of the distributed representation of electronic transaction data corresponding to the second entity identifier. And the steps may include generating the representation of the electronic transaction as an average of at least the first row and the second row.

In some aspects, the components may further include a continuous variable. Generating the representation of the electronic transaction may further comprise discretizing the continuous variable. The components may further include at least one of a time of the electronic transaction, an amount of the electronic transaction, day of week, day of month, and day of year. In some aspects, the decision rule may additionally use fraud criteria, the fraud criteria including at least one of: a card not present indication, a first geographic location associated with the first entity identifier, a second geographic location associated with the second entity identifier, and a predetermining category corresponding to the first entity identifier.

The disclosed embodiments may further include, for example, an authorization server comprising at least one processor and at least one non-transitory computer readable medium. The non-transitory computer readable medium may contain instructions. When executed by the at least one processor, the instructions may cause the authorization server to perform operations. The operations may include receiving a distributed representation of electronic transaction data generated using the above-disclosed computer-implemented method. The operations may also include receiving components of an electronic transaction from a first system, the components including a first entity identifier and a second entity identifier. The components may further include generating a representation of the electronic transaction using the components and the distributed representation. The operations may further include determining authorization of the electronic transaction by applying a decision rule. The decision rule may use the representation of the electronic transaction, and representations of past electronic transactions associated with at least one of the first entity identifier and the second entity identifier. The operations may also include providing an authorization indication to the first system based on the determined authorization.

It is to be understood that both the foregoing general description and the following detailed description are exemplary and explanatory only and are not restrictive of the disclosed embodiments, as claimed.

BRIEF DESCRIPTION OF THE DRAWINGS

The drawings are not necessarily to scale or exhaustive. Instead, emphasis is generally placed upon illustrating the principles of the inventions described herein. The accompanying drawings, which are incorporated in and constitute a part of this specification, illustrate several embodiments consistent with the disclosure and together with the description, serve to explain the principles of the disclosure. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

As described in "A Neural Probabilistic Language Model," by Yoshua Bengio et al., hereby incorporated by reference in its entirety, a distributed representation may characterize a symbol using a set of continuously valued features, mapping the symbol to a location in a high-order space. This approach scales well, allowing for convenient generalization to large numbers of symbols and reducing reliance on labeled training data. Distributed representations may be generated using neural networks. As a non-limiting example, a distributed representation may be included as the input layer in a neural network that also includes at least one hidden layer and an output layer. Training of the neural network may include generation of outputs from training data according to parameters of the neural network. These parameters may include the values of the distributed representation. The outputs may be used to generate updates of the parameters. This training process may be repeated until the parameters demonstrate an acceptable degree of convergence. As would be understood by one of skill in the art, various measures of convergence may be used, and the acceptable degree of convergence may be application-specific. Upon completion of the training process, the distributed representation may map at least some of the symbols in the training set to locations in a higher-order space. This distributed representation of the symbols may then be used for authorizing subsequent electronic transactions.

As would be appreciated by one of skill in the art, the design and training of neural networks for particular applications is extremely unpredictable. Apparently minor changes in neural network characteristics (e.g., the topology of the neural network, the parameters used, the output function, or the update function) may result in poor performance of the neural network. For example, using too many nodes in a hidden layer may cause overfitting of the training data. Such overfitting may result in a neural network that correctly predicts outputs for the training data, but is unable to generalize to new data. Alternatively, using too few nodes in the training data may result in a neural network that simply generates poor predictions of outputs. Changes in the parameters or the output and update functions may also result in poor performance. For example, the neural network may fail to converge on a stable set of parameters, or may quickly converge on parameters resulting in poor predictions. Thus designing a neural network useful for a particular application is not straightforward.

Figure 1A:
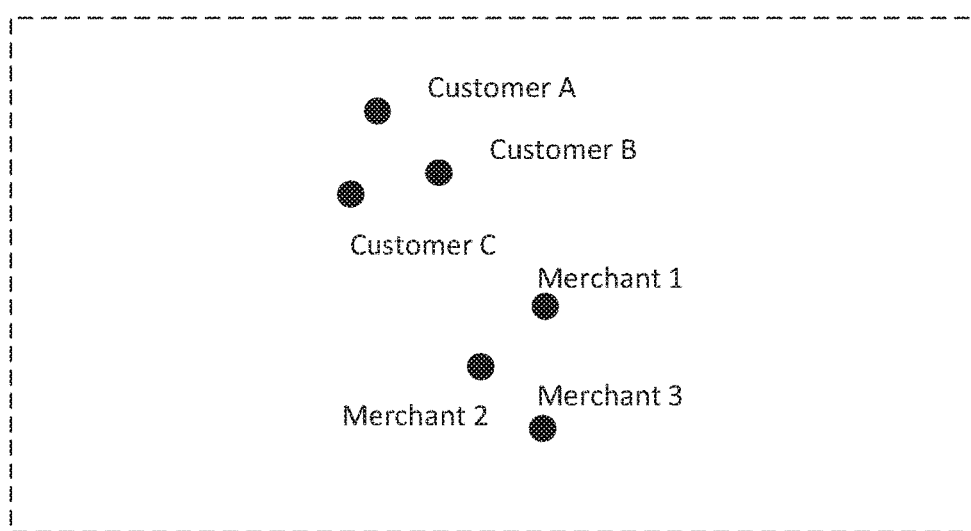
FIGS. 1A-1C depict three projections of a distributed representation of electronic transaction data.
Figure 1B:
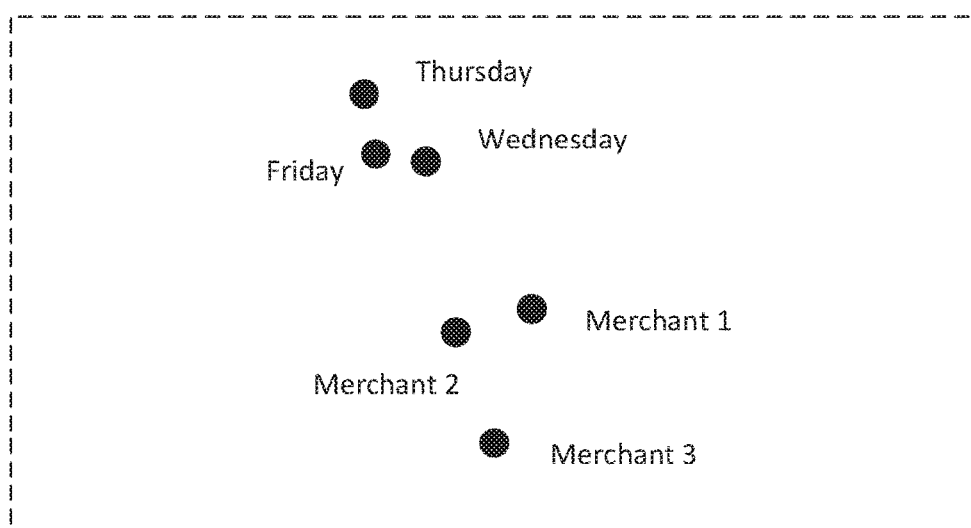
Figure 1C:
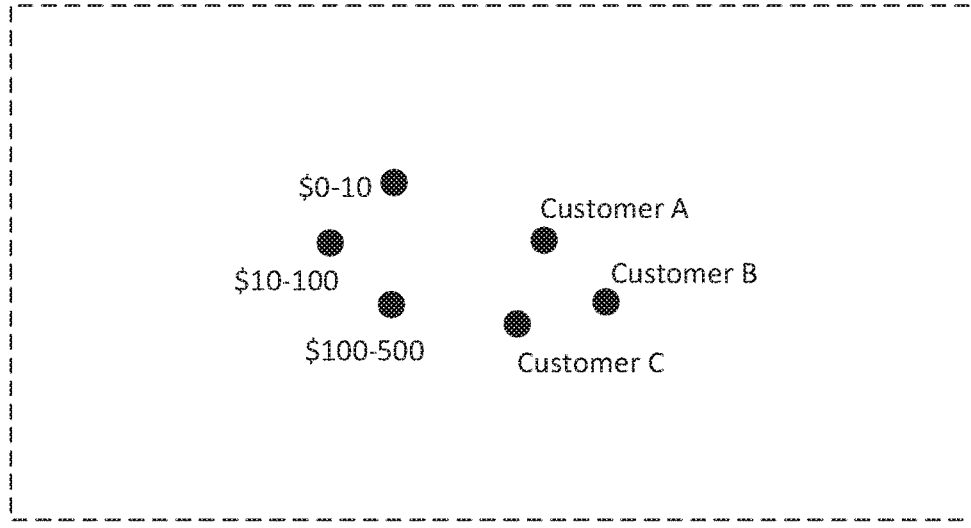

FIGS. 1A-1C depict three projections of a distributed representation of electronic transaction data, consistent with disclosed embodiments. In some embodiments, the distributed representation may be represented as a matrix with rows corresponding to symbols and columns corresponding to features. In some aspects, the elements of the matrix may be continuous-valued. Thus each symbol may be represented by a location in the space defined by the features. In some embodiments, the electronic transaction data may include electronic transaction components, and the distributed representation may include rows corresponding to the electronic transaction components.

The disclosed distributed representation differs from convention data structures that structurally distinguish between electronic transaction components. For example, a relational database may include a row for an electronic transaction, and different columns for entity identifiers (such as merchant identifiers or customer identifiers), day-of-week, etc. Each electronic transaction in such a relational database may be specified by the value of merchant identifier in the merchant identifier column, the value of the customer identifier in the customer identifier column, the value of day-of-week in the day-of-week column. In contrast, as a non-limiting example, the distributed representation may include a row for each value of the merchant identifier, each value of the customer identifier, each day-of-week. As described below with regard to FIGS. 7A and 7B, electronic transactions may be represented, in some embodiments, as functions of these rows.

The distributed representations therefore include rows corresponding to different types of electronic transaction components. As a non-limiting example, electronic transaction data may include components such as one or more identifiers for a first entity such as a merchant, one or more identifiers for a second entity such as a customer, electronic transaction date (e.g., day-of-week, day-of-month, and/or day-of-year), electronic transaction time, electronic transaction amounts, and other electronic transaction data suitable for use in fraud detection (e.g., card presence, electronic transaction location). This use of a distributed representation with row corresponding to values of different electronic transaction components therefore represents an innovative and unconventional approach in the field of fraud detection.

FIGS. 1A-1C depict projections of such an exemplary distributed representation of electronic transaction data. This exemplary distributed representation includes rows corresponding to second entity identifiers (e.g., customers A, B and C), first entity identifiers (e.g. merchant 1, 2, and 3), days of the week (e.g. Thursday, Friday, and Wednesday), and discretized electronic transaction amounts (e.g. less than $10, between $10 and $100, and between $100 and $500). As shown in these exemplary projections, values for each component clusters near values for other such components. For example, values for customer identifiers cluster together, values for merchant identifiers cluster together, values for days-of-week clusters together, and values for discretized electronic transaction amounts cluster together. Additionally, in the high-order space defined by the distributed representation, similar values of each component cluster together. As described below, with regard to FIGS. 7A and 7B, similar electronic transactions may also cluster together.

This innovative and unconventional approach to representing electronic transactions may improve the effectiveness of fraud detection. For example, the distributed representation may reveal latent structures in customer and merchant interactions. Certain interactions with particular types of merchants may be typical for certain types of customers. As a non-limiting example, certain types of customers may routinely frequent chain coffee stores, while other types of customers may routinely frequent specialty coffee stores. As an additional non-limiting example, certain types of customers that routinely frequent certain types of upscale supermarkets may also routinely frequent certain types of fitness establishments. These frequent interactions may cause these customers to cluster together, may cause these merchants to cluster together, and may cause these customers to be closer to these merchants in the space of the distributed representation. Such latent structures may enable beneficial generalizations about customer behavior. For example, an electronic transaction may involve a new combination of customer identifier and merchant identifier. Even though system 200 has not encountered this particular combination of customer identifier and merchant identifier, the distributed representation encodes information about previous electronic transaction between similar customer identifiers and similar merchant identifiers. Thus the distributed representation enables system 200 to make effective authorization decisions about previously un-encountered electronic transactions.

Figure 2:
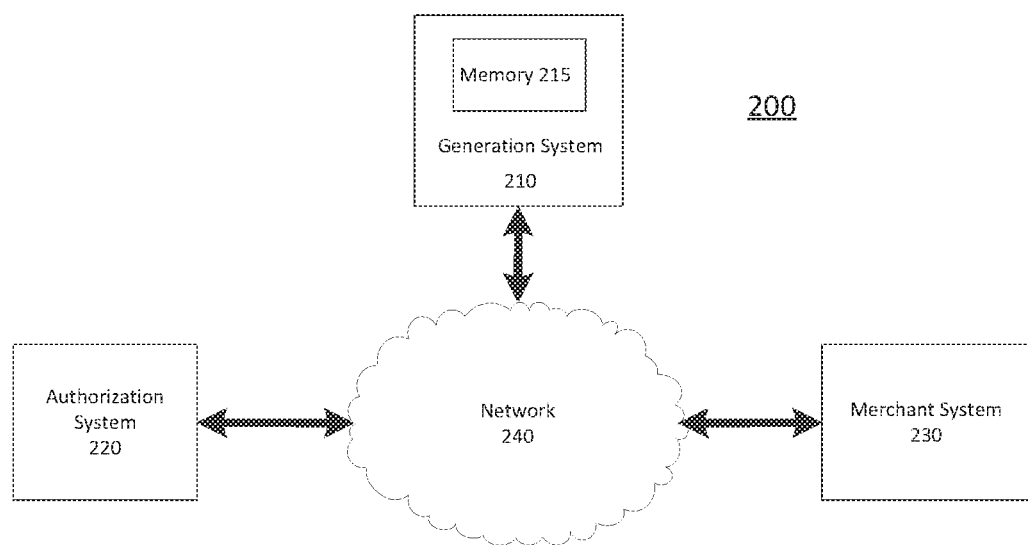
FIG. 2 depicts a schematic illustrating an exemplary system for authorizing electronic transactions.

FIG. 2 depicts a schematic illustrating an exemplary system for authorizing electronic transactions, consistent with disclosed embodiments. This system 200 may comprise generation system 210, authorization system 220, and merchant system 230. In some embodiments, generation system 210 may be configured to generate a distributed representation from electronic transactions data received from another element of system 200, such as authorization system 220 and/or merchant system 230, or from another system. In some embodiments, authorization system 220 may be configured to authorize electronic transactions occurring at merchant system 230, or occurring at another system. These electronic transactions may be authorized using a distributed representation of electronic transaction data. This distributed representation may be received from generation system 210, or another system. Merchant system 230 may be configured to request authorization of an electronic transaction from authorization server, or another system. The elements of system 200 may be configured to communicate over network 240. As would be recognized by one of skill in the art, the depiction of system 200 in FIG. 2 is not intended to be limiting. In some embodiments, additional elements may be added, and/or the depicted elements of system 200 may be combined, divided, modified, or removed. For example, envisioned embodiments may implement a superset or a subset of the depicted elements of system 200.

Generation system 210 may be configured to generate a distributed representation of electronic transaction data, consistent with disclosed embodiments. Generation system 210 may include one or more computing devices, such as servers, workstations, desktop computers, or special-purpose computing devices. In some embodiments, generation system 210 may be implemented using a parallel computing environment, such as the MapReduce architecture described in "MapReduce: Simplified Data Processing on Large Clusters," by Jeffrey Dean and Sanjay Ghemawat, or the Spark architecture described in "Spark: Cluster Computing with Working Sets," by Matei Zaharia, Mosharaf Chowdhury, Michael J. Franklin, Scott Shenker, and Ion Stoica, each of which is incorporated herein by reference in its entirety. Generation system 210 is not limited to a specific parallelization technology, job scheduler (e.g., YARN or Mesos), programming language, parallel computing environment, or parallel computing environment communications protocol. For example, generation system 210 may be implemented in scientific computing clusters, databases, cloud-based computing environments, and ad-hoc parallel computing environments (e.g., SETI at home or the like). In such a parallel computing environment, generation system 210 may be implements as a collection of logical nodes. In some aspects, these logical nodes may include controller, mapper, and reducer nodes, as would be recognized by one of skill in the art. These logical nodes may be implemented using servers, workstations, desktops, graphics cards, videogame systems, embedded systems, or other computing devices according to systems and methods known by one of skill in the art.

Generation system 210 may be standalone, or it may be part of a subsystem, which may be part of a larger system. For example, generation system 210 may be associated with a financial institution, such as a bank (not shown). Generation system 210 may include distributed servers that are remotely located, and may communicate with other systems of the financial institution over a public network, or over a dedicated private network.

Generation system 210 may comprise memory 215, consistent with disclosed embodiments. Memory 215 may be implemented using one or more non-transitory computer memories. In various aspects, memory 215 may comprise one or more hard disk drives, solid state drives, random access memories, or similar non-transitory computer memories. In some aspects, memory 2015 may be implemented using a distributed file system, such as Hadoop Distributed File System, GlusterFS, Parallel Virtual File System, Google File system, Moose File System, or another distributed file system enabling distributed storage, modification, and retrieval of data across a cluster, arrangement, or collection of computing devices.

Figure 3:
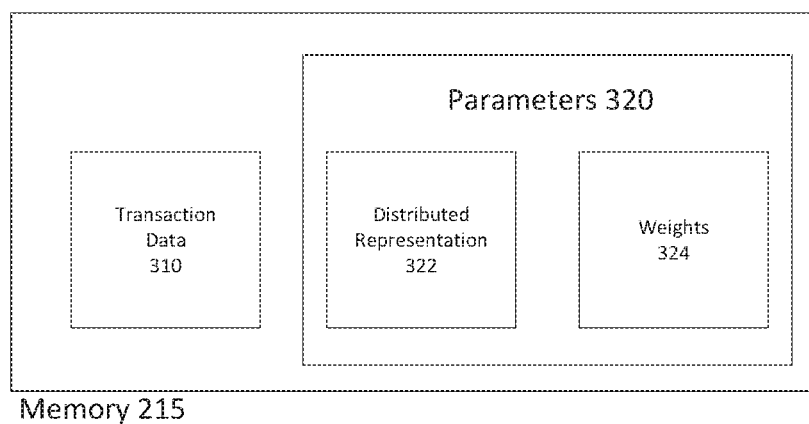
FIG. 3 depicts a logical model of a non-transitory memory storing electronic transaction data, a distributed representation of electronic transaction data, and neural network parameters.

As described in greater detail with regard to FIG. 3, memory 215 may be configured to store data and instructions used to generate the distributed representation of electronic transaction data. In certain aspects, when executed by the one or more computing devices implementing generation system 210, the instructions may cause generation system 210 to perform various disclosed operations. As a non-limiting example, the instructions may cause generation system 210 to generate a distributed representation of the electronic transaction data.

Authorization system 220 may be configured to authorize electronic transactions, consistent with disclosed embodiments. Authorization system 220 may include one or more computing devices, such as servers, workstations, desktop computers, or special-purpose computing devices. Authorization system 220 may be standalone, or it may be part of a subsystem, which may be part of a larger system. For example, authorization system 220 may be associated with a financial institution, such as a bank (not shown). In some aspects, the same financial institution may be associated with generation system 210 and authorization system 220. Authorization system 220 may include distributed servers that are remotely located and communicate with other systems of the financial institution over a public network, or over a dedicated private network. Authorization system 220 may be configured to receive a request to authorize an electronic transaction. In some embodiments, authorization system 220 may receive the request from another element of system 200, such as merchant system 230, or from another system. As described below with regard to FIG. 8, authorization system 220 may be configured to apply a decision rule to determine whether to authorize the electronic transaction. Authorization system 220 may be configured to provide a response to the request based on the application of the decision rule. The response may authorize the electronic transaction.

Merchant system 230 may comprise a system for collecting payment information, consistent with disclosed embodiments. Merchant system 230 may include one or more computing systems, such as servers, general purpose computers, or mainframe computers. For example, Merchant system 230 may comprise one or more point-of-sale terminals, automated teller machines, check verification systems, credit card processing systems, or similar systems. Merchant system 230 may be standalone, or it may be part of a subsystem, which may be part of a larger system. For example, merchant system 230 may be associated with a business institution. As a non-limiting example, the business institution may be a manufacturer, distributor, wholesaler, retailer, service provider, or other commercial entity. As would be recognized by one of skill in the art, the nature of the business institution is not intended to be limiting. Merchant system 230 may include distributed servers that are remotely located, and may communicate with other systems of the business institution over a public network, or over a dedicated private network.

Network 240 may be configured to provide communications between components of FIG. 2. For example, network 240 may be any type of network (including infrastructure) that provides communications, exchanges information, and/or facilitates the exchange of information, such as the Internet, a Local Area Network, or other suitable connection(s) that enables system 200 to send and receive information between the components of system 200.

FIG. 3 depicts a logical model of memory 215, consistent with disclosed embodiments. Memory 215 may be configured to store one or more computer programs, applications, software, firmware, or other instructions (not shown) executable for generating a distributed representation. In some embodiments, memory 215 may be configured to store electronic transaction data 310 and parameters 320. In some aspects, electronic transaction data 310 may comprise one or more electronic transactions. In various aspects electronic transactions may comprise electronic transaction components. As described above, electronic transaction components may include at least one of merchant identifier, customer identifier, date (e.g., day-of-week, day-of-month, and/or day-of-year), time, electronic transaction amount, electronic transaction location, and any other electronic transaction feature recognized by one of skill in the art. Electronic transaction components may be discrete-valued (e.g., merchant identifier, date), or continuous-valued (e.g., amount, time). As a non-limiting example, the $i^{th}$ electronic transaction may be represented by a tuple of electronic transaction components, as follows:

Electronic transaction$_i$={Merchant$_i$ Customer$_i$ Day-of-Week$_i$ Amount$_i$}

As described below with respect to FIGS. 5A-5C, generation system 210 may be configured to implement a neural network for predicting electronic transaction components. In some aspects, parameters 320 may comprise parameters of this neural network. Generation system 210 may be configured to update parameters 320 during training of this neural network. In some embodiments, parameters 320 may include weights 324 and distributed representation 322.

Weights 324 may comprise parameters of the neural network trained to predict electronic transaction components. In some embodiments, as described below with respect to FIGS. 5A-5C, weights 324 may comprise at least one of scaling factors and biases for the nodes of the neural network.

Distributed representation 322 may comprise values corresponding to electronic transaction components, consistent with disclosed embodiments. In some embodiments, distributed representation 322 may include a number of features. In some aspects, the number of features may be between 10 and 10000. In various aspects, the number of features may be between 50 and 3000 features. In some aspects, the number of features may be between 80 and 120 features. Each value of distributed representation 322 may correspond to a feature and at least one value of an electronic transaction component. For example, a value of distributed representation 322 may correspond to both a value of a customer identifier and one of the features. In some embodiments, as described above, distributed representation 322 may be implemented as a matrix, with rows corresponding to electronic transaction components and columns corresponding to features. For example, distributed representation 322 may include rows corresponding to merchant identifiers and rows corresponding to customer identifiers. As an additional example, distributed representation 322 may include rows corresponding to date, time, electronic transaction amount, electronic transaction location, and any other electronic transaction feature recognized by one of skill in the art. In some embodiments, as described above, electronic transaction data 310 may include continuous-valued electronic transaction components. Distributed representation 322 may include rows corresponding to such continuous-valued electronic transaction components. In some aspects, these rows may correspond to sets of values for the continuous-valued electronic transaction components. For example, distributed representation 322 may include rows corresponding to ranges of electronic transaction amounts (e.g., as shown in FIG. 1C). As an additional example, distributed representation 322 may include rows corresponding to electronic transaction location regions (e.g., country, state, city, zip code, or similar regions).

Distributed representation 322 may include rows corresponding to combinations of electronic transaction data 310, consistent with disclosed embodiments. In some aspects, distributed representation 322 may include rows corresponding to multiple values of the same electronic transaction component. As a non-limiting example, distributed representation 322 may include a row corresponding to day-of-week values "Saturday" and "Sunday," (i.e., a "weekend" row) and/or a row corresponding to day-of-week values "Monday," "Tuesday," "Wednesday," "Thursday," and "Friday" (i.e. a "weekday" row). In various aspects, distributed representation 322 may include rows corresponding to multiple values of the different electronic transaction components. As a non-limiting example, distributed representation 322 may include a row corresponding to day-of-week value "Friday" and range of time values 8:00 PM-11:59 PM, and to day-of-week value "Saturday" and range of time values 12:00 AM-6:00 AM (i.e., a "Friday night" row).

In some embodiments, distributed representation 322 may be configured with rows according to predetermined models of customer and merchant interaction. In various embodiments, distributed representation 322 may be empirically configured with rows. For example, in certain aspects, users of system 200 may configure distributed representation 322 with rows corresponding to electronic transaction components, and/or rows corresponding to multiple electronic transaction components, based on the empirical success of previous implementations of distributed representation 322. As a non-limiting example, distributed representation 322 may be configured with rows corresponding to electronic transaction locations when experimentation demonstrates such rows improve fraud detection. In some embodiments, distributed representation 322 may be configured with rows according to an optimization function. For example, an optimization function may assign costs based on the number of rows and the accuracy of predictions, and delete or combine rows to minimize this cost function.

Figure 4:
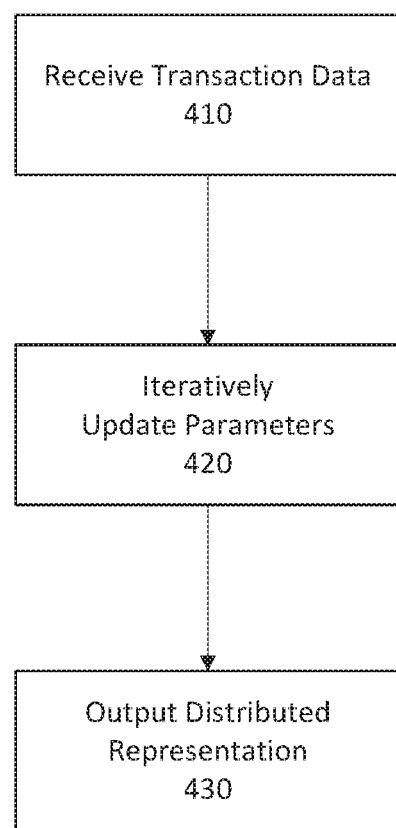
FIG. 4 depicts a flowchart illustrating a process for generating a distributed representation of electronic transaction data.

FIG. 4 depicts a flowchart illustrating a process for generating a distributed representation of electronic transaction data, consistent with disclosed embodiments. In some embodiments, generation system 210, or another system, may be configured to receive electronic transactions, iteratively update parameters 320, and output a final distributed representation (e.g. distributed representation 322). As would be recognized by one of skill in the art, the process illustrated in FIG. 4 is not intended to be limiting. In some embodiments, additional steps may be added, and/or the steps illustrated in FIG. 4 may be combined, divided, modified, or removed. For example, envisioned embodiments may implement a superset or a subset of the steps illustrated in FIG. 4.

Generation system 210 may be configured to receive electronic transaction data in step 410, consistent with disclosed embodiments. In some embodiments, the electronic transaction data may be received from another element of system 200, or another system. In some aspects, generation system 210 may be configured to receive electronic transaction data from merchant system 230 (and optionally from other merchant systems). In various aspects, generation system 210 may be configured to receive electronic transaction data from authorization system 220. For example, authorization system 220 may be configured to accumulate electronic transaction data, and to provide the accumulated electronic transaction data to generation system 210. In some aspects, generation system 210 may be configured to receive electronic transaction data from another system, such as a database of electronic transaction information. In some aspects, as discussed above with regard to FIG. 2, the same financial institution may be associated with at least one of the database of electronic transaction information, generation system 210, and authorization system 220. In some embodiments, the electronic transaction may be received over network 240. In various embodiments, the electronic transactions may be received on a tangible non-transitory computer readable media, such as a flash drive, optical disk, or other storage media.

The received electronic transaction data may be limited to electronic transactions satisfying criteria, consistent with disclosed embodiments. In some embodiments, the criteria may involve at least one of time, geographic location, customer, merchant, and similar electronic transaction criteria. For example, the received electronic transaction data may be limited to electronic transactions occurring within a time period or geographical area, involving certain merchants or customers, or having certain electronic transaction amounts. As a non-limiting example, the received electronic transaction data may comprise electronic transactions occurring within the previous hour, day, week, month, year, or other time period; or electronic transactions occurring within a time interval. In some embodiments, the criteria may involve electronic transaction component values satisfying criteria. For example, the received electronic transaction data may comprise electronic transactions with certain customer identifier(s), merchant identifier(s), date(s), electronic transaction location(s), electronic transaction time, electronic transaction amounts, and other electronic transaction data suitable for use in fraud detection (e.g., card presence, electronic transaction location).

In some embodiments, generation system 210 may be configured to process the received electronic transaction data. In some embodiments, generation system 210 may be configured to discard or re-code electronic transactions satisfying a criteria. As a non-limiting example, generation system 210 may be configured to determine customer identifiers and/or merchant identifiers involved in fewer than a predetermined number of received electronic transactions. This predetermined number may be an absolute number, or may be expressed as a percentage of the number of received electronic transactions. In some aspects, electronic transactions including these customer identifiers and/or merchant identifiers may be removed from the received electronic transaction data. In certain aspects, these customer identifiers may be re-coded to an "all-other" customer identifier and/or these merchant identifiers may be re-coded to an "all-other" merchant identifier. As would be appreciated by one of skill in the art, generation system 210 may be configured to similarly discard or re-code values of other electronic transaction components.

In some embodiments, generation system 210 may be configured to adjust the relative proportion of electronic transaction component values in the received electronic transaction data. For example, identifiers for certain merchants (e.g., chain supermarkets) may be frequently represented in the received electronic transaction data, while identifiers for other merchants (e.g., luxury goods retailers) may be rarely represented in the received electronic transaction data. These relative differences in representation may result in biases in the distributed representation.

Generation system 210 may therefore be configured to determine the frequencies of electronic transaction component values in the received electronic transaction data, consistent with disclosed embodiments. For example, generation system 210 may be configured to determine frequencies for the merchant identifiers in the received electronic transaction data. In some aspects, generation system 210 may be configured to resample electronic transactions including rarely represented electronic transaction component values. Resampling may include duplicating randomly selecting electronic transactions including the rarely represented electronic transaction component values. In various aspects, generation system 210 may be configured to discard electronic transactions including frequently represented electronic transaction component values. The electronic transaction may be randomly discarded. In some aspects, electronic transaction component values may be automatically or manually identified as rarely or frequently represented. This identification may occur according to methods of outlier analysis known to those of skill in the art.

For example, given a chain supermarket involved in 10% of the received electronic transactions, and a luxury retailer involved in 0.1% of the received electronic transactions, generation system 210 may be configured to discard electronic transactions involving the chain supermarket and resample electronic transactions involving the luxury retailer. This processing may reduce the disparity between the proportion of electronic transactions involving the chain supermarket and the number of electronic transactions involving the luxury retailer. For example, after processing of the received electronic transactions, the chain supermarket may be involved in 5% of the processed received electronic transactions and the luxury retailer may be involved in 0.5% of the processed received electronic transactions. As would be appreciated by one of skill in the art, the above merchant categories and proportions are exemplary and not intended to be limiting.

Generation system 210 may be configured to iteratively update parameters 320 in step 420 to generate an output distributed representation, consistent with disclosed embodiments. As described below with regard to FIG. 5A-5C, generation system 210 may be configured to update parameters 320 using the received electronic transaction data. In some embodiments, generation system 210 may be configured to iteratively update parameters (step 420) until a termination condition is satisfied. This termination condition may comprise at least one of an elapsed time condition, a cost condition, and an improvement rate condition. For example, generation system 210 may be configured to iteratively update parameters (step 420) until a predetermined amount of time elapses. As an additional example, generation system 210 may be configured to iteratively update parameters (step 420) until a cost function crosses a predetermined level. In some aspects, the cost function may indicate the effectiveness of the neural network at predicting electronic transaction components. Satisfying the cost condition may indicate that the neural network has achieved a predetermined degree of accuracy. As an additional example, generation system 210 may be configured to iteratively update parameters (step 420) until a rate of change in the cost function crosses a predetermined level. In some aspects, a large rate of change in the cost function may indicate rapid improvements in effectiveness, while a small (or negative) rate of change in the in the cost function may indicate slow improvements in effectiveness (or a decrease in effectiveness). Consistent with disclosed embodiments, the distributed representation upon satisfaction of the termination condition may comprise the output distributed representation.

Generation system 210 may be configured to output the output distributed representation in step 430, consistent with disclosed embodiments. For example, generation system 210 may be configured to store the output distributed representation on a non-transitory, computer-readable medium, such as memory 215; another computer memory; or a flash drive, optical disk, or other tangible storage media. As an additional example, generation system 210 may be configured to provide at least some of the output distributed representation to another component of system 200, or another system. In some aspects, generation system 210 may be configured to provide the rows of the distributed representation corresponding to at least one electronic transaction component to the authorization system 220. As a non-limiting example, generation system 210 may be configured to provide the rows corresponding to the merchant identifiers, and/or the customer identifiers. In various aspects, generation system 210 may be configured to provide the entire distributed representation to the authorization system 220.

In some embodiments, generation system 210, another element of system 200, or another system, may be configured to combine distributed representations, as described below with regards to FIGS. 9 and 10A-10C. For example, in some aspects, generation system 210 may be configured to identify common rows in the output distributed representation and another distributed representation, align the output distributed representation and the other distributed representation using values of the common rows, and combine the output distributed representation and the other distributed representation. Generation system 210 may be configured to output this combined distributed representation. In some aspects, generation system 210 may be configured to store this combined distributed representation in a non-transitory, computer-readable media. In various aspects, generation system 210 may be configured to provide at least some of the output distributed representation to another element of system 200, or another system.

Figure 5A:
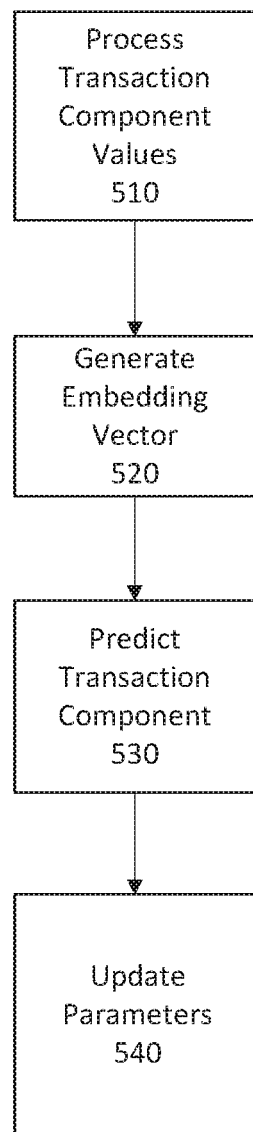
FIG. 5A depicts a flowchart illustrating a process for updating a distributed representation of electronic transaction data.
Figure 5B:
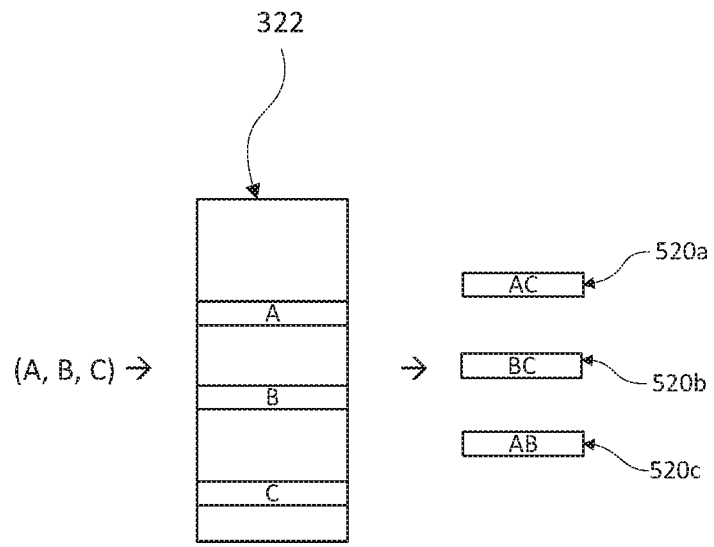
FIG. 5B depicts details of input mapping and generation of input vectors.
Figure 5C:
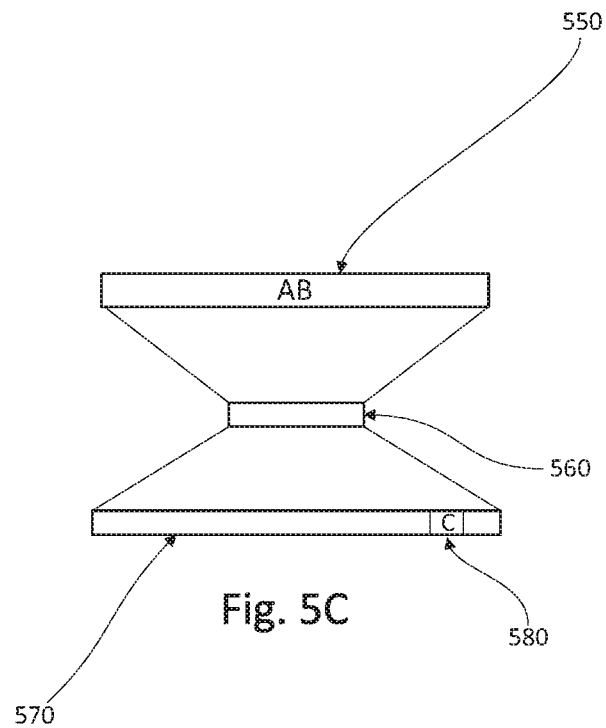
FIG. 5C depicts details of predicting an electronic transaction component.

FIGS. 5A-5C depict updating a distributed representation of electronic transaction data, consistent with disclosed embodiments. FIG. 5A depicts a flowchart illustrating a process for updating a distributed representation of electronic transaction data, while FIG. 5B depicts exemplary details of input mapping and generation of input vectors and FIG. 5C depicts exemplary details of predicting an electronic transaction component. In some embodiments, generation system 210 may be configured to process electronic transaction component values to identify corresponding rows in distributed representation 322. Generation system 210 may then be configured to generate training samples, according to the methods disclosed in "word2vec Parameter Learning Explained," by Xin Rong ("Parameter Learning"), herein incorporated by reference. As would be recognized by one of skill in the art, the process illustrated in FIG. 5A and the exemplary details depicted in FIGS. 5B and 5C are not intended to be limiting. In some embodiments, additional steps may be added, and/or the steps illustrated in FIG. 5A may be combined, divided, modified, or removed. For example, envisioned embodiments may implement a superset or a subset of the steps illustrated in FIG. 5A. Similarly, in some embodiments, input mapping, generation of input vectors, and predicting an electronic transaction component may differ from the exemplary details depicted in FIGS. 5B and 5C.

Generation system 210 may be configured to process electronic transaction component values in step 510, consistent with disclosed embodiments. In some embodiments, generation system 210 may be configured to map electronic transaction components to rows of distributed representation 322. For example, as shown in FIG. 5B, given an electronic transaction with three electronic transaction components having values A, B, and C, generation system 210 may be configured to map these electronic transaction components values to three rows of distributed representation 322.

Generation system 210 may be configured to discretize continuous-valued electronic transaction components, consistent with disclosed embodiments. In some embodiments, generation system 210 may be configured to map these discretized values to rows of distributed representation 322. For example, generation system 210 may be configured to map values of an electronic transaction amount to amount ranges (e.g., less than $10, between $10 and $50, between $50 and $500, over $500). As an additional example, generation system 210 may be configured to map values of an electronic transaction time to times ranges (e.g., between 12:00 AM and 6:00 AM, between 6:00 AM and 9:00 AM, between 9:00 AM and 10:00 AM, etc.). In some aspects, these time and amount ranges may correspond to rows of distributed representation 322.

In some aspects, generation system 210 may be configured to map electronic transaction components to rows of distributed representation 322 using contextual information distinct from electronic transaction data 310. Such contextual information may concern electronic transaction components. For example, contextual information may concern the customer associated with the customer identifier, the business institution associated with the merchant identifier, the electronic transaction data, or other contextual information. For example, generation system 210 may be configured to map electronic transaction components to rows of the distributed representation using customer account information from systems of an associated financial institution. As a further example, the customer account information may include address information, and the generation system 210 may be configured to use this address information to map electronic transaction location values to rows of distributed representation 322. In some aspects, generation system 210 may be configured to map electronic transaction location values to rows of distributed representation 322 corresponding to distance ranges from an address associated with the customer identifier (e.g., less than 1 mile, between 1 mile and 10 miles, greater than 10 miles).

Generation system 210 may be further configured to generate training samples for an update, consistent with disclosed embodiments. In some aspects, as described in Parameter Learning, the training samples may be positive training samples. As a non-limiting example, in a positive sample generation system 210 may be configured to select an electronic transaction component value of the electronic transaction as a positive training sample. In some aspects, selection may include determining the row corresponding to the selected electronic transaction value. For example, given electronic transaction data comprising a merchant identifier, a customer identifier, and an electronic transaction amount of $11.37, generation system 210 may be configured to map the electronic transaction amount to the range of between $10 and $50 dollars. This range may correspond to a row of distributed representation 322. In this non-limiting example, generation system 210 may select the range of between $10 and $50 dollars as the training example for the update. In various aspects, as described in Parameter Learning, the training samples may be negative training samples. As a non-limiting example, random rows may be selected from distributed representation 322, and these random rows may be used as negative training examples. In such aspects, generation system 210 may be configured to generate the embedding vector as disclosed above, but the update step may differ, and may depend on the estimated probabilities for both a positive training sample and the negative training samples, as described in Parameter Learning, and incorporated herein by reference.

Generation system 210 may be configured to generate an embedding vector in step 520, consistent with disclosed embodiments. For example, the embedding vector may include values corresponding to the features in distributed representation 322. In some aspects, the length of the embedding vector may equal the number of features in distributed representation 322. Similarly, the length of the embedding vector may equal the length of the rows in distributed representation 322. Generation system 210 may be configured to generate the embedding vector using the electronic transaction components and distributed representation 322. In some aspects, as shown in FIG. 5B, generation system 210 may be configured to generate the embedding vector using the rows corresponding to at least some of the processed electronic transaction component values. For example, when generation system 210 selects one of the processed electronic transaction component values as a positive training sample, generation system 210 may be configured to generate the embedding vector using the rows corresponding to the remaining processed electronic transaction component values. In some aspects, the embedding vector may be a function of these rows. For example, the embedding vector may be a linear combination of these rows, with each contribution to this linear combination having a non-zero coefficient. As an additional example, the embedding vector may be an average of these rows.

As shown in FIG. 5B, multiple embedding vectors may be generated from a single electronic transaction, depending on the selected training example. For example, generation system 210 may be configured to generate embedding vector 520a from the rows corresponding to electronic transaction component values A and C, when the row corresponding to electronic transaction component value B comprises the training example; generate embedding vector 520b from the rows corresponding to electronic transaction component values B and C, when the row corresponding to electronic transaction component value A comprises the training example; and generate embedding vector 520c from the rows corresponding to electronic transaction component values A and B, when the row corresponding to electronic transaction component value C comprises the training example.

Generation system 210 may be configured to predict the training example in step 530, consistent with disclosed embodiments. As shown in FIG. 5C, in some aspects, generation system 210 may be configured to predict the training example using an input layer 550, a hidden layer 560, and an output layer 570. In some embodiments, input layer 550 may comprise a vector with a width equal to the width of the embedding vector. Generation system 210 may be configured to set the values of input layer 550 equal to the values of the embedding vector (e.g., embedding vector 520c). The values of the embedding vector may be used to calculate input values for the hidden layer. For example:

$$o = d + Hx$$

where x is the embedding vector, H is a matrix of weights mapping the embedding vector into the space of the hidden layer, d is a vector of biases, and o is the vector of inputs to the hidden layer. Generation system 210 may be configured to store d and H in weights 324. In some embodiments, the size of the hidden layer may be between 10 and 10,000 nodes, between 50 and 3000 nodes, or between 80 and 120 nodes. In some aspects, the width of the hidden layer may equal the number of features. In some aspects, the elements of hidden layer 560 may have activation values dependent on input values. For example:

$$a = f(o)$$

where a is a vector of activation values, o is the previously disclosed a vector of input values, and $f(o)$ is a function of the input values. In some embodiments, $f(o)$ may be a linear function, a sigmoidal function, a hyperbolic tangent, or another function used for calculating activation values for neural networks, as would be known by one of skill in the art. The activation values may be used to calculate the output values provided by output layer 570. For example:

$$y = b + Ua$$

where b is a vector of output biases, U is a matrix of weights mapping the previously disclosed vector of activation values to output values, and y is a matrix of output values for the hidden layer. Generation system 210 may be configured to store b and U in weights 324. In some embodiments, the vector of output values for the hidden layer may additionally or alternatively depend directly on the values of the embedding vector. For example:

$$y = b + Wx + Ua$$

where W is a matrix of weights mapping the embedding vector directly to the output vector. Generation system 210 may be configured to store W in weights 324.

In some embodiments, output layer 570 may be configured to compute at least one likelihood from the output values of the hidden layer. In certain aspects, this likelihood may be a probability. In some embodiments, output layer 570 may be configured to compute the likelihood as a softmax function. For example:

$$P(C_i | C_j, C_k, \ldots) = e^{y_i} / \Sigma_n e^{y_n}$$

where $P(C_i | C_j, C_k, \ldots)$ is the estimated likelihood that the training sample (i.e. $C_i$) corresponds to the $i^h$ element of output layer 570, given an embedding vector input generated using the rows of distributed representation 322 corresponding to the remaining electronic transaction component $\{C_j, C_k, \ldots\}$. In some aspects, y may be the value of the output layer provided to the $i^{th}$ element of output layer 570 by hidden layer 560. In some various aspects, $y_i$ may be based on the value of the output layer provided to the $i^{th}$ element of output layer 570 by hidden layer 560. For example, $y_{th}$ may be modified to prevent numerical instabilities or inaccuracies associated with exponentiation. As an additional example, $y_i$ may be the difference between the value of the output layer provided to the $i^{th}$ element of output layer 570 by hidden layer 560, and another such value (as a non-limiting example, the minimum, average, or median of such values).

As a non-limiting example, when the electronic transaction includes electronic transactions components A, B, and C, each corresponding to a row of the distributed representation, and the embedding vector comprises the average of the rows corresponding to the electronic transaction component A and B, then output layer 570 may comprise estimates that elements of output layer 570 correspond to the missing electronic transaction component. For example, when parameters 320 converge on suitable values, the likelihood value for the element 580 of output layer 570 may be the greatest likelihood value for output layer 570.

Generation system 210 may be configured to update parameters 320 in step 540, consistent with disclosed embodiments. In some embodiments, generation system 210 may be configured to use a gradient ascent (or gradient descent) method to update parameters 320. For example:

$$\Delta \theta = \varepsilon \frac{\delta \log(P(C_i \mid C_j, C_k, \ldots))}{\delta \theta}$$

Where $\Delta \theta$ comprises the update to parameters 320 and E is a training parameter, selected according to methods known to one of skill in the art. As noted above, $P(C_i|C_j, C_k, \ldots)$ may be the likelihood function, and the cost may be calculated as the logarithm of this likelihood function. As would be appreciated by one of skill in the art, this choice of likelihood function is not intended to be limiting.

The update of the future parameters may be calculated according to backpropagation algorithms known to one of skill in the art. As a non-limiting example, the change in the cost function with respect to the inputs of output layer 570 may be calculated as follows:

$$\frac{\delta L}{\delta y_m} = 1_{m==i} - p_m$$

Where $$\frac{\delta L}{\delta y_m}$$

is the change in the cost function, $1_{m==i}$ is valued as 1 when the index m of the output layer equals the index i of the row corresponding to the training example, and $P_m$ is the estimated likelihood for index m of output layer 570. As a non-limiting example, the values for the updates to weights 324 may be calculated as follows:

$$\frac{\delta L}{\delta a} = \frac{\delta L}{\delta y} U$$

$$\frac{\delta L}{\delta o} = \frac{\delta L}{\delta a} f'(o)$$

$$\frac{\delta L}{\delta x} = \frac{\delta L}{\delta y} W + \frac{\delta L}{\delta o} H$$

$$\Delta b = \varepsilon \frac{\delta L}{\delta y}$$

$$\Delta W = \varepsilon \frac{\delta L}{\delta y} x$$

$$\Delta U = \varepsilon \frac{\delta L}{\delta y} a$$

$$\Delta d = \varepsilon \frac{\delta L}{\delta o}$$

$$\Delta H = \varepsilon \frac{\delta L}{\delta o} x$$

The values for the rows of distributed representation 322 corresponding to the electronic transactions components may also be updated. These updates may be based on the change in the cost function. In some aspects, the update may be implemented as an update vector, or as an assortment or collection of scalars. The number of scalars, or length of the vector, may equal a length of the rows of the distributed representation. For example, the size of the update vector may equal the length of the embedding vector. As an additional example, the value of the update may depend on $$\varepsilon \frac{\delta L}{\delta x}.$$

In some aspects, the update for each corresponding row may be equal. For example, when the electronic transaction comprises components A, B, and C, and the embedding vector is generated from the rows of distributed representation 322 corresponding to A and B, these rows may be equally updated based on $$\frac{\delta L}{\delta x},$$

change in the cost function with respect to a change in the embedding vector, and $\varepsilon$, the training parameter. As would be recognized by one of skill in the art, other backpropagation algorithms may also be used, and the above example is not intended to be limiting. For example, negative sampling may be used, as described above with respect to FIG. 4. When negative sampling is used, the update may depend on the calculated likelihoods of the negative samples, as well as the calculated likelihood of the positive samples, as described in Parameter Learning and incorporated herein by reference.

Figure 6:
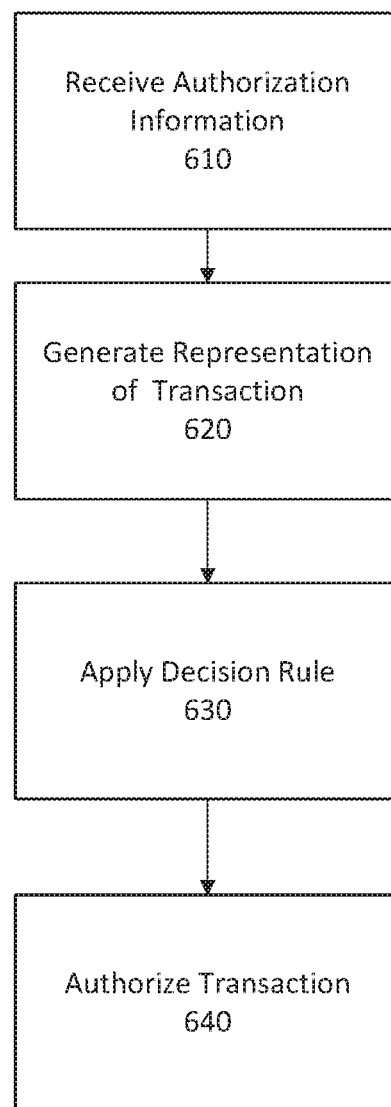
FIG. 6 depicts a flowchart illustrating a process for authorizing electronic transactions.

FIG. 6 depicts a flowchart illustrating a process for authorizing electronic transactions using distributed representation 322, consistent with disclosed embodiments. As shown in FIG. 6, authorization system 220 may be configured to receive authorization information, generate a representation of the electronic transaction; apply a decision rule; and authorize the electronic transaction (or not authorize the electronic transaction) based on the result of applying the decision rule. As would be recognized by one of skill in the art, art, the process illustrated in FIG. 6 is not intended to be limiting. In some embodiments, additional steps may be added, and/or the steps illustrated in FIG. 6 may be combined, divided, modified, or removed. For example, envisioned embodiments may implement a superset or a subset of the steps illustrated in FIG. 6.

Authorization system 220 may be configured to receive authorization information in step 610, consistent with disclosed embodiments. In some embodiments, the authorization information may comprise at least one of a distributed representation, an electronic transaction, a representation of an electronic transaction, a decision rule, historical electronic transaction data, and representations of historical electronic transaction data. In some embodiments, at least some of the authorization information may be received from another component of system 200, such as merchant system 230, or another system. In various embodiments, at least some of the authorization information may be retrieved from a non-transitory computer readable medium, such as a computer memory associated with authorization system 220.

In some embodiments, authorization system 220 may be configured with a distributed representation including rows corresponding to the electronic transaction component values comprising the electronic transaction (e.g., distributed representation 322). For example, authorization system 220 may be configured to receive a distributed representation from another component of system 200, such as generation system 210, or another system. In some embodiments, one or more of the electronic transaction and distributed representation 322 may be received over network 240. In some embodiments, the received electronic transaction may comprise electronic transaction components, as disclosed above. For example, the electronic transaction components may include merchant identifiers, customer identifiers, electronic transaction date (e.g., day-of-week, day-of-month, and/or day-of-year), electronic transaction time, electronic transaction amount, and other electronic transaction data suitable for use in fraud detection (e.g., card presence, electronic transaction location).

Figure 7A:
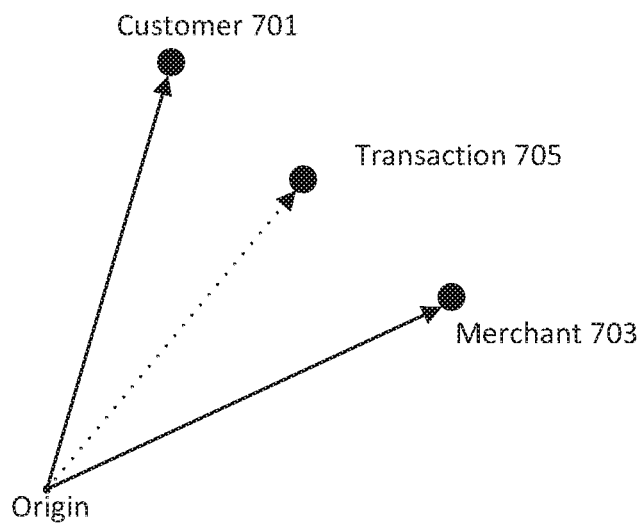
FIG. 7A depicts a representation of an electronic transaction.

Authorization system 220 may be configured to generate a representation of the electronic transaction in step 620. In some aspects, as shown in FIG. 7A, authorization system 220 may be configured to represent the electronic transaction in the space of distributed representation 322. In various aspects, authorization system 220 may be configured to map the electronic transaction component values to rows of the distributed representation, as described above with regard to FIG. 5A. For example, authorization system 220 may be configured to discretize continuous-valued electronic transaction component values, or map electronic transaction component values to rows based on contextual information.

In some aspects, authorization system 220 may be configured to use the rows of the distributed representation corresponding to the electronic transaction component values to determine a location of the electronic transaction in the space of distributed representation 322 (e.g., electronic transaction 705). For example, as depicted in FIG. 7A, customer 701 may be the location in distributed representation 322 corresponding to a customer identifier for the electronic transaction. Merchant 703 may be the location in distributed representation 322 corresponding to a merchant identifier for the electronic transaction. In some aspects, authorization system 220 may be configured to determine the location of the electronic transaction as a linear combination of the rows corresponding to the electronic transaction components of the received electronic transaction. In this non-limiting example, authorization system 220 may be configured to determine the electronic transaction 705 as a linear combination of customer 701 and merchant 703. In some aspects, authorization system 220 may be configured to determine the location of the electronic transaction as the average of the rows corresponding to the electronic transaction component values of the received combination. For example, electronic transaction 705 may be the average of customer 701 and merchant 703.

Figure 7B:
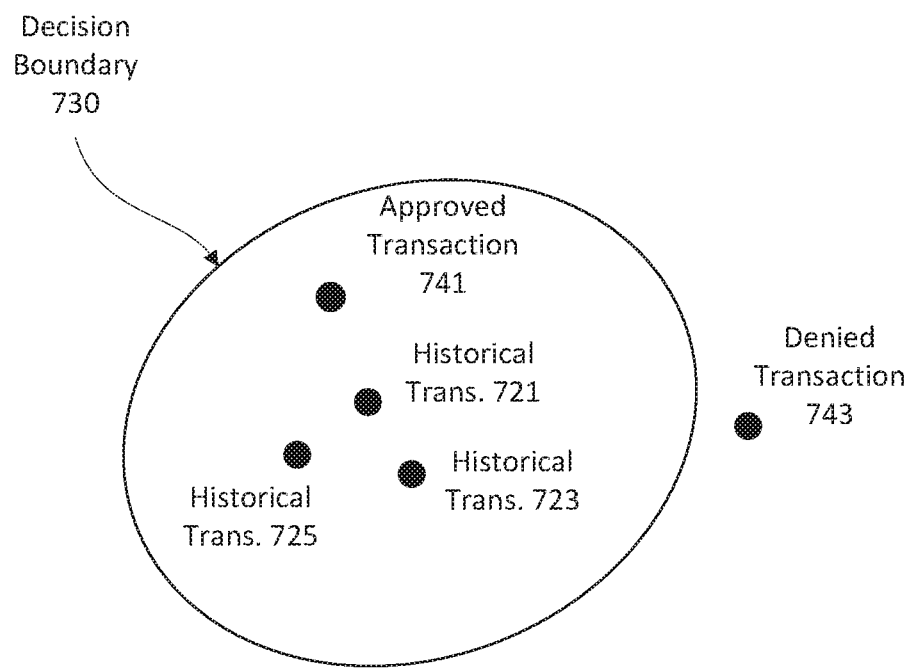
FIG. 7B depicts authorization of electronic transactions based on a decision rule and previous electronic transactions.

Authorization system 220 may be configured to apply a decision rule in step 630, consistent with disclosed embodiments. In some embodiments, the decision rule may be implemented as a partition on the space of distributed representation 322. In some aspects, as shown in FIG. 7B, authorization system 220 may be configured to use decision boundary 730 to discriminate between acceptable and unacceptable electronic transactions. For example, authorization system 220 may be configured to provide an authorization indication for electronic transactions within decision boundary 730 (e.g., approved electronic transaction 741). As an additional example, authorization system 220 may be configured to deny authorization for electronic transactions outside of decision boundary 730 (e.g., denied electronic transaction 743). For example, authorization system 220 may be configured to not provide an authorization indication for such electronic transactions. As a further example, authorization system 220 may be configured to provide a denial-of-authorization indication for such electronic transactions.

Authorization system 220 may be configured to request historical electronic transaction data, consistent with disclosed embodiments. In some aspects, authorization system 220 may be configured to request all available historical electronic transaction data. In various aspects, authorization system 220 may be configured to request a limited subset of available historical electronic transaction data. In some aspects, the limits on the subset may concern electronic transaction components. For example, the subset may be limited to electronic transactions including an electronic transaction components satisfying criteria. The criteria may concern a single electronic transaction component. As a non-limiting example, the subset may comprise electronic transactions including a merchant or set of merchants. As a further non-limiting example, the subset may comprise electronic transactions including a customer or set of customers. The criteria may concern multiple electronic transaction components. As a non-limiting example, the subset may comprise electronic transactions including a customer or set of customers, and amounts in excess of a certain amount. In some aspects, authorization system 220 may be configured to provide the criteria to one or more of another component of system 200 and a component of another system.

Authorization system 220 may be configured to receive the historical electronic transaction data from a network socket, a source of messages in a publication and subscription framework (e.g., Apache Kafka), or a data stream (e.g., as computer network traffic). In various aspects, authorization system 220 may be configured to retrieve the historical electronic transaction data from a non-transitory computer-readable medium, such as a computer memory associated with at least one of authorization system 220, another component of system 200, and another system.

The historical electronic transaction data may associate previous electronic transactions with locations in distributed representation 322, consistent with disclosed embodiments. In some embodiments, historical electronic transaction data may correspond to previous electronic transactions. In various aspects, in the manner discussed above with regards to FIGS. 5A-5C, the historical electronic transaction data may comprise tuples of historical electronic transaction components. As a non-limiting example, authorization system 220 may be configured to receive historical electronic transaction data as tuples of customer identifier and merchant identifier (e.g., customer 701 and merchant 703). In various aspects, historical electronic transaction data may be received as electronic transaction locations. As a non-limiting example, authorization system 220 may be configured to receive historical electronic transaction data as a set of electronic transaction locations, the electronic transaction locations specifying locations in distributed representation 322 (e.g., electronic transaction 705).

In some embodiments, the historical electronic transaction data may summarize a set of previous electronic transactions. For example, the historical electronic transaction data may comprise statistical summary information. In some aspects, the statistical summary information may comprise one or more locations in distributed representation 322 representative of the set of previous electronic transactions. As a further non-limiting example, the one or more locations may be representative of clusters of previous electronic transactions. For example, the one or more locations may correspond to one or more central points of the representative clusters. In some embodiments, the statistical summary information may comprise measures of dispersion. In some aspects, the measures of dispersion may comprise one or more distances. The one or more distances may correspond to the one or more central points, such that one or more predetermined percentages of electronic transactions associated with the one or more central points are within the one or more corresponding distances. As a non-limiting example, a first central point may define a first cluster of electronic transactions, and 95% of the electronic transactions associated with the first cluster may lie within the first distance of the first central point. In various aspects, the measures of dispersion may comprise one or more statistical measures of dispersion, such standard deviations.

Authorization system 220 may be configured to apply the decision rule using the historical electronic transaction data, consistent with disclosed embodiments. In some embodiments, applying the decision rule may comprise determining whether a distance from the representation of the received electronic transaction in distributed representation 322 exceeds a value. The distance may be to a point in distributed representation 322 dependent on the historical electronic transaction data. For example, authorization system 220 may be configured to generate a partition of distributed representation 322 using the statistical summary information disclosed above. As an additional example, authorization system 220 may be configured to determine whether an electronic transaction lies within a distance from a central point in the space of distributed representation 322 (e.g., approved electronic transaction 741), or lies outside the distance from the central point in the space of distributed representation 322 (e.g., denied electronic transaction 743). The decision rule may comprise data or instructions stored in a non-transitory computer readable medium, such as a computer memory, for performing this analysis, given the historical electronic transaction data.

Authorization system 220 may be configured to generate the partition based on the individual electronic transactions, consistent with disclosed embodiments. For example, authorization system 220 may be configured to cluster the individual electronic transactions into one or more clusters, and to determine the resemblance of the received electronic transaction to the one or more of clusters. As an example, authorization system 220 may be configured to determine a cluster from historical trans. 721, historical trans. 723 and historical trans. 725, and determine, according to methods known in the art, that one electronic transaction (e.g., approved electronic transaction 741) may be included in that cluster, while another electronic transaction (e.g., denied electronic transaction 743) may not be included in that cluster. The decision rule may comprise data or instructions stored in a non-transitory memory for performing this analysis, given the historical electronic transaction data.

In some embodiments, authorization system 220 may be configured to determine a representative electronic transaction component value, consistent with disclosed embodiments. In some aspects, authorization system 220 may be configured to determine a representative merchant value based on at least some rows corresponding to merchant identifiers in the distributed representation. As a non-limiting example, the historical electronic transaction data may include merchant identifiers, and authorization system 220 may be configured to average the rows of distributed representation 322 corresponding to these merchant identifiers to generate a "typical" merchant value. In some aspects, authorization system 220 may be configured to determine whether the received electronic transaction lies within a predetermined distance of this "typical" merchant value. For example, the received electronic transaction may include a customer identifier and a merchant identifier. The historical electronic transaction data may be limited to electronic transactions including the customer identifier. The historical electronic transaction data may include merchant identifiers, and authorization system 220 may be configured to generate a "typical" merchant value based on the rows of distributed representation 322 corresponding to these merchant identifiers. Authorization system 220 may be configured to determine whether the value in distributed representation 322 for the merchant identifier in the received electronic transaction is within a predetermined distance of this "typical" merchant value. In some aspects, authorization system 220 may be configured to determine a representative customer value based on at least some rows corresponding to customer identifiers in the distributed representation. For example, authorization system 220 may be configured to determine a "typical" customer value in a similar manner to the determination of the "typical" merchant value described above. Authorization system 220 may be configured to determine whether the value in distributed representation 322 for the customer identifier in the received electronic transaction is within a predetermined distance of this "typical" customer value. In some embodiments, authorization system 220 may be configured to determine whether criteria based on multiple "typical" components are satisfied by the components of the received electronic transaction. For example, authorization system 220 may be configured to determine the differences between multiple "typical" electronic transaction component values and values in distributed representation 322 for corresponding components of the received electronic transaction. Authorization system 220 may be configured to determine a value based on these differences, and to determine whether this value falls within a predetermined threshold. The decision rule may comprise data or instructions stored in a non-transitory memory for performing this analysis, given the historical electronic transaction data.

In some embodiments, authorization system 220 may be configured to use both the distributed representation and additional fraud criteria in applying the decision rule. In some embodiments, authorization system 220 may be configured to apply the additional fraud criteria first, before determining whether a distance from the representation of the received electronic transaction in distributed representation 322 exceeds a value. For example, authorization system 220 may be configured to use distributed representation 322 as a secondary check for electronic transactions flagged according to the fraud criteria. In various embodiments, authorization system 220 may be configured to determine whether a distance from the representation of the received electronic transaction in distributed representation 322 exceeds a value first, before applying the additional fraud criteria. Thus authorization system 220 may be configured to use the fraud criteria as a secondary check of electronic transactions flagged using distributed representation 322. In some embodiments, authorization system 220 may be configured to integrate distributed representation 322 and the additional fraud criteria. For example, authorization system 220 may be configured to determine a fraud score based on distributed representation 322 and the additional fraud criteria. As a non-limiting example, the fraud score may comprise a linear combination of fraud values and fraud weights. The fraud values may depend on the fraud criteria and distributed representation 322. For example, a fraud value for distributed representation 322 may depend on a distance from the received electronic transaction in distributed representation 322, as disclosed above. In some aspects, at least one of the fraud values may be discrete-valued. For example, a fraud value for distributed representation 322 may be zero or one depending on whether the distance from the received electronic transaction exceeds a predetermined value. In some aspects, at least one of the fraud values may be continuous-valued. For example, the fraud value for distributed representation 322 may be a continuously valued function of the distance from the received electronic transaction, optionally parameterized by the predetermined value. For example, the fraud value for distributed representation 322 may be the distance normalized by the predetermined value. The values for the weights may be determined using historical electronic transaction data according to methods known to one of skill in the art. In some embodiments, authorization system 220 may be configured to apply the decision rule as a threshold fraud score, and approve the received electronic transaction based on the calculated fraud score and the threshold fraud score. For example, where an increasing fraud score indicates an increasing likelihood of fraud, authorization system 220 may be configured to approve electronic transactions with a calculated fraud score below the threshold value.

The additional fraud criteria may include, as a non-limiting example, at least one of a card not present indication, a first geographic location associated with the merchant identifier, a second geographic location associated with the customer identifier, and a predetermining category corresponding to the merchant identifier. The first geographic location may include, for example, the geographic location of a store of the business institution associated with the merchant identifier. The received electronic transaction may be occurring at the store. The second geographic location may include, for example, the geographic location of an address of the customer associated with the customer id. The address may be a home address, a mailing address, a work address, or another similar address. The predetermined category may indicate the primary category of goods or services offered by the business institution associated with the merchant identifier. The predetermined category may comprise, for example, a merchant category code (MCC).

Authorization system 220 may be configured to authorize an electronic transaction in step 640, consistent with disclosed embodiments. As described above, in some embodiments, authorization system 220 may be configured to authorize a received electronic transaction based on application of a decision rule. In some embodiments, authorization may be expressed by providing an authorization indication to another component of system 200, or to a component of another system. For example, authorization system 220 may be configured to send an authorization indication to a system of a financial institution. As described above, the financial institution may be associated with at least one of generation system 210 and authorization system 220. Additionally or alternatively, authorization system 220 may be configured to send an authorization indication to merchant system 230. In some aspects, the authorization indication may comprise an affirmation of authorization. In various aspects, the authorization indication may comprise a denial-of-authorization indication. In some aspects, failure to provide an affirmation of authorization, for example within a period of time, may comprise a denial-of-authorization indication. In some embodiments, the electronic transaction may proceed based on the authorization indication, according to systems and methods for settling electronic transactions known to one of skill in the art.

Figure 8:
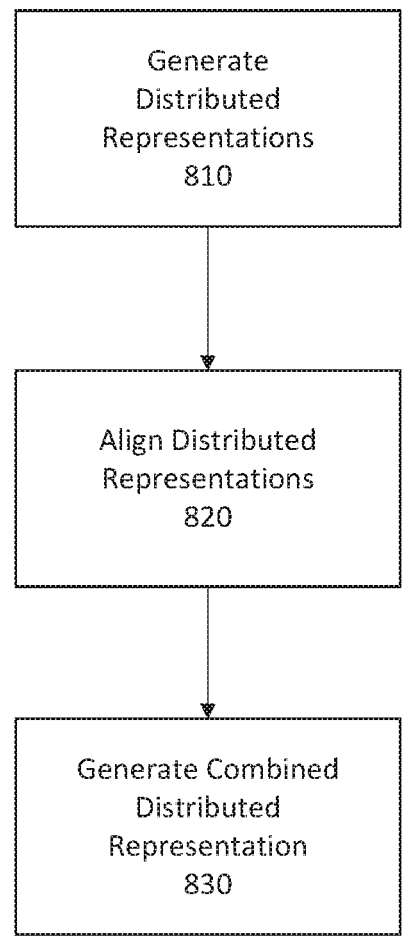
FIG. 8 depicts a flowchart illustrating a process for generating a combined distributed representation.

FIG. 8 depicts a flowchart illustrating a process for generating a combined distributed representation, consistent with disclosed embodiments. In some aspects, generation system 210 may be configured to generate multiple distributed representations (e.g., distributed representation 322) from differing sets of electronic transaction data. In various aspects, generation system 210 may be configured to receive at least one of the distributed representations to be combined. Generation system 210 may be configured to align these distributed representations. Generation system 210 may further be configured to generate a combined distributed representation from these distributed representations. As would be recognized by one of skill in the art, the process illustrated in FIG. 8 is not intended to be limiting. In some embodiments, additional steps may be added, and/or the steps illustrated in FIG. 8 may be combined, divided, modified, or removed. For example, envisioned embodiments may implement a superset or a subset of the steps illustrated in FIG. 8. Additionally, though described below with regards to generation system 210, alignment and generation of the combined distributed representation may be performed by another element of system 200 (e.g., authorization system 220), or by another system.

Generation system 210 may be configured to generate multiple distributed representations in step 810. In some embodiments, generation system 210 may be configured to generate distributed representations from differing sets of electronic transaction data. In some aspects, generation system 210 may be configured to generate distributed representations from sets of electronic transaction data limited to differing geographic areas, or differing electronic transaction time periods. For example, generation system 210 may be configured to generate distributed representations corresponding to differing cities, metropolitan areas, states, regions, countries, or other geographic areas. As an additional example, generation system 210 may be configured to generate distributed representations corresponding to different time periods, such as different days, weeks, months, years, or other differing time intervals.

Figure 9A:
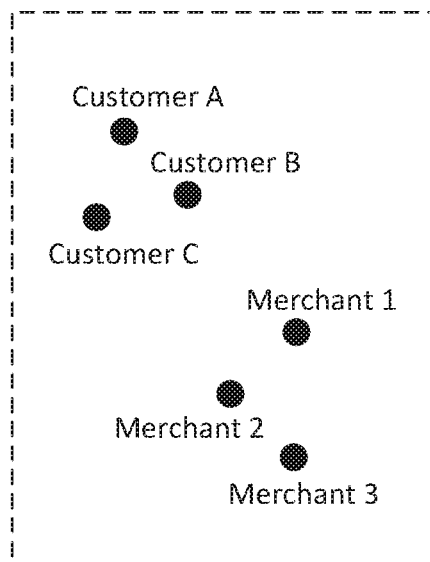
FIGS. 9A-9C depict three projections of distributed representations illustrating an exemplary alignment of distributed representations.
Figure 9B:
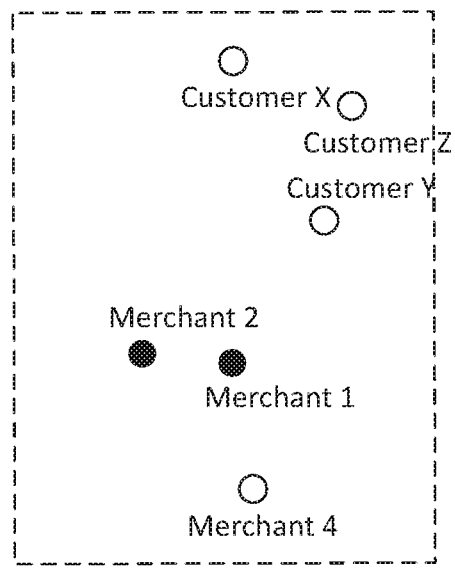
Figure 9C:
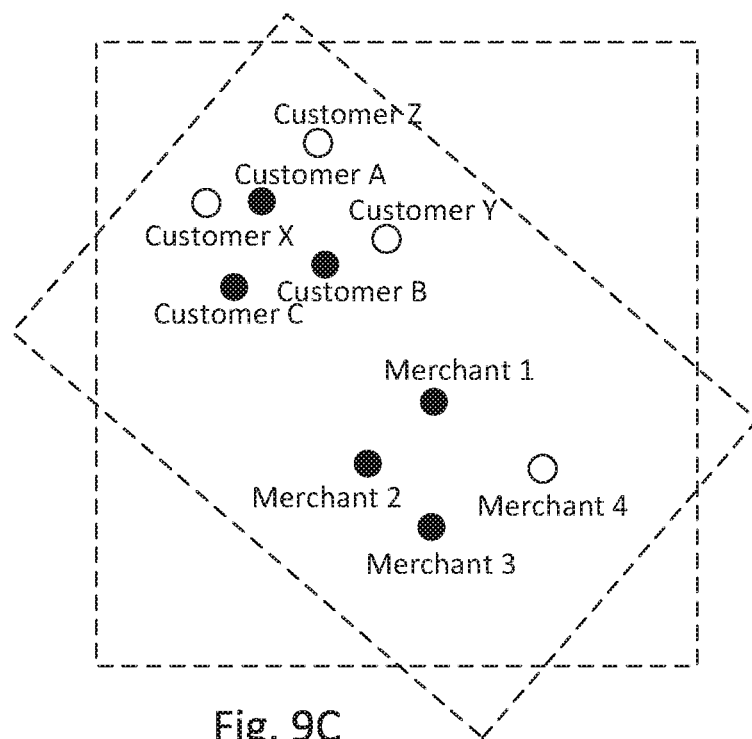

Generation system 210 may be configured to align distributed representations in step 820, consistent with disclosed embodiments. FIGS. 9A-9C depict three projections of distributed representations illustrating an exemplary alignment of distributed representations. As a non-limiting example, FIG. 9A depicts a first distributed representation generated from a first set of electronic transaction data, and FIG. 9B depicts a second distributed representation generated from a second set of electronic transaction data. As shown in these non-limiting examples, the each of the first and second distributed representations includes rows not present in the other distributed representation. For example, the first distributed representation includes a row corresponding to "Customer A," but not a row corresponding to "Customer Y." Similarly the second distributed representation includes a row corresponding to "Merchant 4," but not a row corresponding to "Merchant 3." However, as also shown in these non-limiting examples, a common subset of rows may be present in multiple representations. For example, "Merchant 2" and "Merchant 1" are present in both the first and second distributed representations. In some aspects, the common rows may correspond to major retail chains or franchises, such as supermarkets, restaurants, or department stores. For example, common rows may correspond to retailers such as McDonalds, Burger King, Starbucks, Walmart, Target, Whole Foods, or similar major retail chains or franchises.

In some embodiments, generation system 210 may be configured to estimate a transformation between the first and second distributed representations based on the common rows. These transformations may comprise one or more of a rotation, translation, and scaling of at least one of the distributed representations. In some embodiments, generation system 210 may be configured to estimate a transformation between a first and second distributed representation that minimizes a cost function. In some embodiments, the cost function may depend on the difference between the locations of the common rows in a distributed representation and the transformed locations of the common rows in another distributed representation. As a non-limiting example:

$$f(x_1, x_2) = \Sigma_i (x_{1i} - g(x_{2i}))(x_{1i} - g - g(x_{2i}))^T$$

In the above relationship, $f(x_1, x_2)$ may be a cost function of the matrix $x_1$ in the first distributed representation and the matrix $x_2$ in the second distributed representation, where the matrices $x_1$ and $x_2$ comprise rows of the first and second distributed representations with common electronic transaction component values. The transformation $g(x_{2i})$ may map individual rows of $x_2$ to the space of the first distributed representation. Generation system 210 may be configured to estimate $g(x_{2i})$ to minimize $f(x_1, x_2)$, according to method known to one of skill in the art. As would be appreciated by one of skill in the art, the estimation of the transformation may be formulated differently, and the above formulation is not intended to be limiting.

Generation system 210 may be configured to generate a combined distributed representations in step 830. In some embodiments, the combined distributed representation may be generated from the first and second distributed representations using the estimated transformation. As a non-limiting example, FIG. 9C depicts the distributed representation of FIG. 9B transformed based on the common rows corresponding to "Merchant 1" and "Merchant 2". As shown in this non-limiting example, this transformation maps "Customer X," "Customer Y," and "Customer Z" from the second distributed representation into the proximity of "Customer A," "Customer B," and "Customer C" from the first representation. Likewise, "Merchant 4" from the second distributed representation is mapped into the proximity of "Merchant 3" from the first distributed representation. In some embodiments, the combined distributed representation may include rows corresponding to all electronic transaction component values in either distributed representation. In various embodiments, the combined distributed representation may include rows corresponding to all merchant identifiers and/or customer identifiers. In some embodiments, the combined distributed representation may include the values of the first distributed representation for the common rows. In various embodiments, the combined distributed representation may include the transformed values of the second distributed representation for the common rows. In some embodiments, the combined distributed representation may include a function of the values of the first distributed representation and the transformed values of the second distributed representation for the common rows. In some aspects, the function may be an average.

Figure 10:
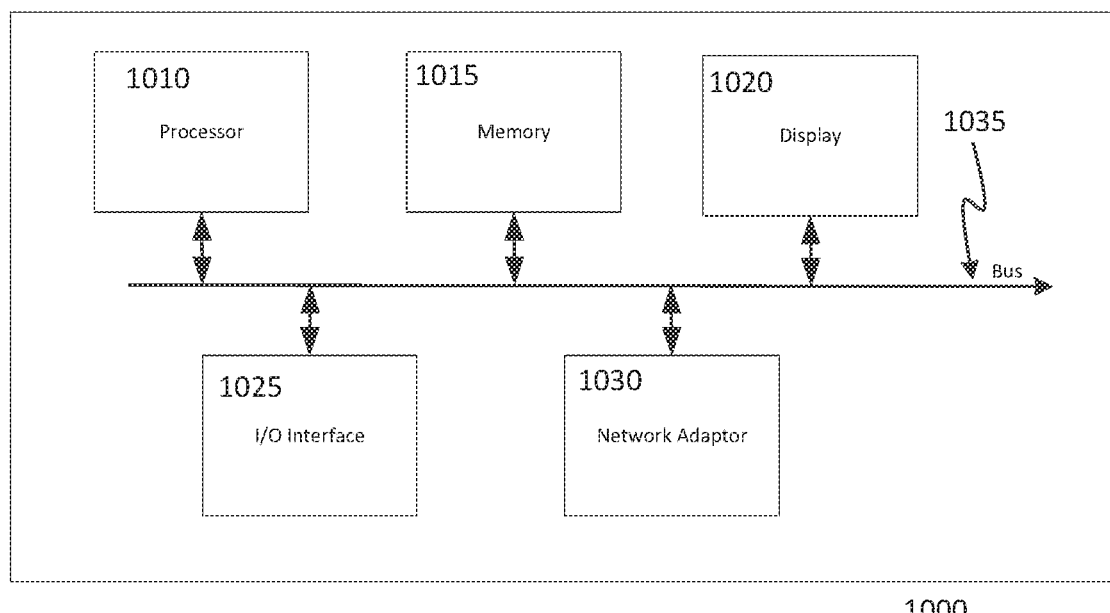
FIG. 10 depicts a schematic of an exemplary computing device for performing the envisioned systems and methods.

FIG. 10 depicts a schematic of exemplary computing system 1000 for performing the envisioned systems and methods, consistent with disclosed embodiments. In some embodiments, computer system 1000 includes a processor 1010, memory 1015, display 1020, I/O interface(s) 1025, and network adapter 1030. These units may communicate with each other via bus 1035, or wirelessly. The components shown in FIG. 10 may reside in a single device or multiple devices.

Consistent with disclosed embodiments, processor 1010 may be a central processing unit (CPU), graphical processing unit (GPU), or similar microprocessor having one or more processing cores. Computer system 1000 may include one or more processors 1010 and may further operate with one or more other processors that are remote with respect to processors 1010. Memory 1015 may include non-transitory memory containing non-transitory instructions, such as a computer hard disk, random access memory (RAM), removable storage, or remote computer storage. In some aspects, memory 1015 may be configured to store data and instructions, such as software programs. For example, memory 1015 may be configured to store data and instructions, as described above with regards to memory 215 in FIG. 3. In some aspects, processor 1010 may be configured to execute non-transitory instructions and/or programs stored on memory 1015 to configure computer system 1000 to perform operations of the disclosed systems and methods. In various aspects, as would be recognized by one of skill in the art, processor 1010 may be configured to execute non-transitory instructions and/or programs stored on a remote memory to perform operations of the disclosed systems and methods.

Display 1020 may be any device which provides a visual output, for example, a computer monitor, an LCD screen, etc. I/O interfaces 1025 may include hardware and/or a combination of hardware and software for communicating information to computer system 1000 from a user of computer system 1000, such as a keyboard, mouse, trackball, audio input device, touch screen, infrared input interface, or similar device. Network adapter 1030 may include hardware and/or a combination of hardware and software for enabling computer system 1000 to exchange information using external networks, such as network 240. For example, network adapter 1030 may include a wireless wide area network (WWAN) adapter, a Bluetooth module, a near field communication module, or a local area network (LAN) adapter.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims. Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

What is claimed is:

1. An authorization system comprising:
   at least one processor; and
   at least one non-transitory computer readable medium containing instructions that when executed by the at least one processor cause the authorization system to perform operations comprising:
   receiving electronic transaction data and historical transaction data, the electronic transaction data including an entity identifier component and an amount component of an electronic transaction;
   determining a location of the electronic transaction in a space of a distributed representation comprising a mapping of electronic transaction components in a high-order space comprising first rows corresponding to entities and second rows corresponding to amount ranges based on the electronic transaction data;
   determining locations of the historical transaction data in the distributed representation space;
   determining a location of a first point in the distributed representation space based on averaging the locations of the historical transaction data;
   determining a first distance from the location of the electronic transaction to the first point in the distributed representation space; and
   authorizing the electronic transaction based on the first distance and the first point.

2. The authorization system of claim 1, wherein determining the location of the first point based on the locations of the historical transaction data includes clustering the locations of the historical transaction data to determine central points, the central points including the first point.

3. The authorization system of claim 1, wherein the historical transaction data is limited to electronic transactions including components satisfying one or more criteria.

4. The authorization system of claim 1, wherein the historical transaction data includes one or more locations in the distributed representation space representative of previous electronic transactions, the one or more locations including the first point, and one or more corresponding distances, the one or more corresponding distances including the first distance.

5. The authorization system of claim 4, wherein locations in the distributed representation space of a predetermined percentage of previous electronic transactions associated with the first point are closer to the first point than the first distance.

6. The authorization system of claim 1, wherein determining the location of the electronic transaction includes:
   identifying rows of the distributed representation, the identified rows including one of the first rows corresponding to a value of the entity identifier component and one of the second rows corresponding to a value of the amount component; and
   determining the location of the electronic transaction as a linear combination of the identified rows.

7. The authorization system of claim 1, wherein the electronic transaction data further includes at least one of an electronic transaction time component, a day of week component, a day of month component, and a day of year component.

8. The authorization system of claim 1, the operations further comprising determining a fraud score based on fraud criteria and the distributed representation space.

9. The authorization system of claim 8, wherein the fraud criteria include at least one of:
   a card not present indication,
   a geographic location associated with the entity identifier component, and
   a predetermined category corresponding to the entity identifier component.

10. An authorization method performed by one or more authorization servers, comprising:
    receiving an electronic transaction associated with a first entity and historical transaction data for the first entity;
    receiving a distributed representation comprising a mapping of electronic transaction components in a high-order space, including first rows corresponding to entities and second rows corresponding to amount ranges;
    determining a location of the electronic transaction in a space of the distributed representation based on a second entity associated with the electronic transaction and an amount associated with the electronic transaction;
    determining locations of the historical transaction data in the distributed representation space;
    determining a location of a first point in the distributed representation space based on averaging the locations of the historical transaction data; and
    authorizing the electronic transaction using a decision rule, the location of the electronic transaction in the distributed representation space, and the location of the first point.

11. The authorization method of claim 10, the method further comprising receiving contextual information associated with the first entity, the contextual information distinct from the historical transaction data, and wherein the location of the electronic transaction in the distributed representation space is further based on the contextual information.

12. The authorization method of claim 11, wherein the contextual information includes an address of the first entity.

13. The authorization method of claim 10, wherein the distributed representation includes third rows corresponding to distance ranges, and wherein the location of the electronic transaction in the distributed representation space is further based on a location associated with the electronic transaction.

14. The authorization method of claim 10, wherein the electronic transaction is received from a system associated with the second entity, and wherein the location of the electronic transaction in the distributed representation space depends on values of a row of the distributed representation corresponding to the second entity.

15. The authorization method of claim 10, the method further including mapping the amount to an amount range, and wherein determining the location of the electronic transaction in the distributed representation space includes determining a row of the distributed representation corresponding to the amount range.

16. The authorization method of claim 10, wherein the electronic transaction is associated with a geographic area and the distributed representation corresponds to the geographic area.

17. The authorization method of claim 10, wherein the decision rule partitions the distributed representation space into acceptable and unacceptable electronic transactions.

18. An authorization system comprising
at least one processor; and
at least one non-transitory computer readable medium containing instructions that when executed by the at least one processor cause the authorization system to perform operations comprising:
 receiving data for an electronic transaction including values for multiple components;
 receiving historical transaction data including sets of values for the multiple components;
 determining an electronic transaction component location in a space of a distributed representation comprising a mapping of electronic transaction components in a high-order space for each of the multiple components based on the electronic transaction data;
 determining a typical location in the distributed representation space for each of the multiple components based on averaging the sets of values for the multiple components;
 determining differences between the electronic transaction component locations and the typical locations for each of the multiple components; and
 authorizing the electronic transaction when the differences satisfy one or more authorization criteria.

* * * * *